United States Patent
Kuraseko et al.

(10) Patent No.: US 7,976,967 B2
(45) Date of Patent: Jul. 12, 2011

(54) GLASS SUBSTRATE FOR MAGNETIC DISK APPARATUS

(75) Inventors: Hiroshi Kuraseko, Tokyo (JP); Nobuaki Orita, Tokyo (JP); Yasuhiro Naka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 96 days.

(21) Appl. No.: 12/267,917

(22) Filed: Nov. 10, 2008

(65) Prior Publication Data

US 2009/0122448 A1    May 14, 2009

(30) Foreign Application Priority Data

Nov. 13, 2007  (JP) ................. 2007-294758

(51) Int. Cl.
  *G11B 5/65*  (2006.01)
  *G11B 5/33*  (2006.01)
  *B32B 3/10*  (2006.01)

(52) U.S. Cl. ............... 428/846.9; 428/848.1; 428/848.6; 428/64.1; 360/235.4

(58) Field of Classification Search ............... 428/846.9, 428/846.2, 421, 848.2, 848.6, 64.1, 821; 360/236.3, 135, 136, 234.6, 235.4; 65/30.14
See application file for complete search history.

(56) References Cited

U.S. PATENT DOCUMENTS

| | | | |
|---|---|---|---|
| 2003/0133227 A1* | 7/2003 | Anan et al. | 360/236.3 |
| 2003/0172677 A1* | 9/2003 | Miyamoto et al. | 65/30.14 |
| 2005/0047019 A1* | 3/2005 | Childers et al. | 360/244.3 |
| 2005/0233151 A1* | 10/2005 | Feist et al. | 428/421 |
| 2006/0263921 A1 | 11/2006 | Nakamura et al. | |
| 2007/0002494 A1* | 1/2007 | Takahashi et al. | 360/234.6 |
| 2007/0269684 A1* | 11/2007 | Machida et al. | 428/846.9 |
| 2008/0193801 A1* | 8/2008 | Haneda et al. | 428/846.9 |
| 2009/0136786 A1* | 5/2009 | Aida et al. | 428/846.2 |

FOREIGN PATENT DOCUMENTS

| | | | |
|---|---|---|---|
| JP | 3184261 | | 4/2001 |
| JP | 2001-319326 | | 11/2001 |
| JP | 2003-242627 | | 8/2003 |
| JP | 2006099949 | * | 4/2006 |
| WO | 2007034763 | * | 3/2007 |
| WO | 2007072835 | * | 6/2007 |

OTHER PUBLICATIONS

Machine translation JP 2006099949, Apr. 2006, Haneda et al.*

* cited by examiner

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

A main surface of a glass substrate for a magnetic disk is disk-shaped and has a ski jump on an outer peripheral end portion of the main surface opposing a magnetic head slider to be loaded. A rate of change of angles of tangents to a slope of the ski jump in a radial direction in a range between an inner circumferential side and a transition point on the slope is equal to or less than $10/W$ μrad/mm where W is a width of the magnetic head slider.

2 Claims, 5 Drawing Sheets

FIG.9

| SAMPLE NO. | RATE OF CHANGE OF ANGLE OF TANGENTS MAXIMUM [μrad/mm] | SKI JUMP HEIGHT | | | | NUMBER OF LUL OPERATIONS UNTIL CRASH OCCURS | | | | ASSESSMENT |
|---|---|---|---|---|---|---|---|---|---|---|
| | | MAXIMUM [nm] | MINIMUM [nm] | AVERAGE [nm] | DEVIATION [%] | EQUAL TO OR MORE THAN 500,000 | FROM 450,000 TO 500,000 | FROM 400,000 TO 450,000 | LESS THAN 400,000 | |
| 1 | 6.4 | 398.0 | 350.6 | 378.1 | 7.3 | 9 | 1 | 0 | 0 | A |
| 2 | 11.4 | 236.4 | 180.7 | 204.4 | 15.7 | 5 | 2 | 2 | 1 | C |
| 3 | 9.2 | 319.2 | 195.9 | 301.1 | 34.9 | 7 | 0 | 0 | 3 | B |
| 4 | 3.5 | 212.6 | 169.8 | 185.5 | 14.6 | 8 | 2 | 0 | 0 | A |
| 5 | 14.8 | 286.5 | 211.7 | 221.9 | 29.1 | 2 | 2 | 3 | 3 | C |
| 6 | 13.3 | 294.8 | 230.2 | 250.6 | 17.6 | 1 | 1 | 3 | 5 | C |
| 7 | 21.6 | 406.7 | 271.9 | 380.5 | 28.5 | 1 | 1 | 2 | 6 | C |
| 8 | 8.8 | 375.5 | 341.2 | 360.9 | 5.5 | 9 | 2 | 0 | 0 | A |
| 9 | 9.6 | 124.2 | 80.3 | 105.9 | 24.2 | 8 | 0 | 0 | 0 | A |
| 10 | 7.3 | 182.1 | 116.9 | 161.0 | 27.4 | 7 | 1 | 1 | 2 | B |

GLASS SUBSTRATE FOR MAGNETIC DISK APPARATUS

BACKGROUND OF THE INVENTION

1. Field of the Invention

The present invention relates to a glass substrate for a magnetic disk and a magnetic disk apparatus.

2. Description of the Related Art

In responding to the recent trend for magnetic disk apparatuses, such as hard disk drives, of fast-paced improvement of information recording density, a fly height of a magnetic head or a magnetic head slider that opposes the surface of a magnetic disk has been reduced. A load/unload method, see for example, Japanese Patent Application Laid-open No. 2001-319326, is being adopted to prevent adhesion of the magnetic head to the magnetic disk due to reduction of the fly height. Various technologies are available to prevent head crash, which consequently damages the magnetic disk, in the load/unload method, that is, to prevent the magnetic head slider loaded onto the magnetic disk from a ramp from hitting the surface of the recoding zone. For example, Japanese Patent Application Laid-open No. 2001-319326 discloses a technology for preventing a direct contact between the magnetic head slider and the recording-zone surface by forming a convex portion as an initial floating area in a loading area that locates away from an outer circumference of the recording zone of a magnetic disk.

In a polish-finished glass substrate for a magnetic disk, a protrusion called a ski jump appears on a peripheral portion of a main surface. According to Japanese Patent No. 3184261, if the maximum height of a ski jump less than 0.35 micrometer, a magnetic head slider floats properly over the ski jump, which allows expansion of a recording zone on the magnetic disk.

Japanese Patent Application Laid-open No. 2003-242627 discloses expanding a recording zone by improving the flatness of a slope of a ski jump. Specifically, when the shape of the slope of the ski jump is defined as a distance called a radial curvature (RC), the RC of equal to or less than 50 nanometers allows an improvement of the flatness of the slope of the ski jump, thus expanding the recording zone.

However, even if a ski jump is formed in accordance with the conventional technique, a magnetic head slider still has a chance of coming into contact with a main surface of a magnetic disk when the magnetic head slider is loaded or unloaded, so that the magnetic head slider can not stably float over the magnetic disk, leading to head crash.

SUMMARY OF THE INVENTION

It is an object of the present invention to at least partially solve the problems in the conventional technology.

According to an aspect of the present invention, there is provided a glass substrate for use in a magnetic disk configured to be incorporated in a magnetic disk apparatus that operates based on a load/unload method. A main surface of the glass substrate is disk-shaped and a ski jump appears on an outer peripheral end portion of the main surface opposing a magnetic head slider to be loaded, and a rate of change of angles of tangents to a slope of the ski jump in a radial direction in a range between an inner circumferential side and a transition point on the slope is equal to or less than 10/W μrad/mm where W is a width of the magnetic head slider.

According to another aspect of the present invention, there is provided a magnetic disk apparatus that operates based on a load/unload method and includes a magnetic disk made of a glass substrate and a magnetic head slider that is loaded onto a main surface of the magnetic disk. The main surface of the glass substrate is disk-shaped and a ski jump appears on an outer peripheral end portion of the main surface opposing the magnetic head slider to be loaded, and a rate of change of angles of tangents to a slope of the ski jump in a radial direction in a range between an inner circumferential side and a transition point on the slope is equal to or less than 10/W μrad/mm where W is a width of the magnetic head slider.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table illustrating characteristics of the ski jump, the number of load/unload operations until head crash occurs, and assessment of manufactured samples of the glass substrates.

DETAILED DESCRIPTION OF THE PREFERRED EMBODIMENTS

Exemplary embodiments of the present invention are explained in detail below with reference to the accompanying drawings. The embodiments are explained by using a 1-inch magnetic disk apparatus.

Figure 1:
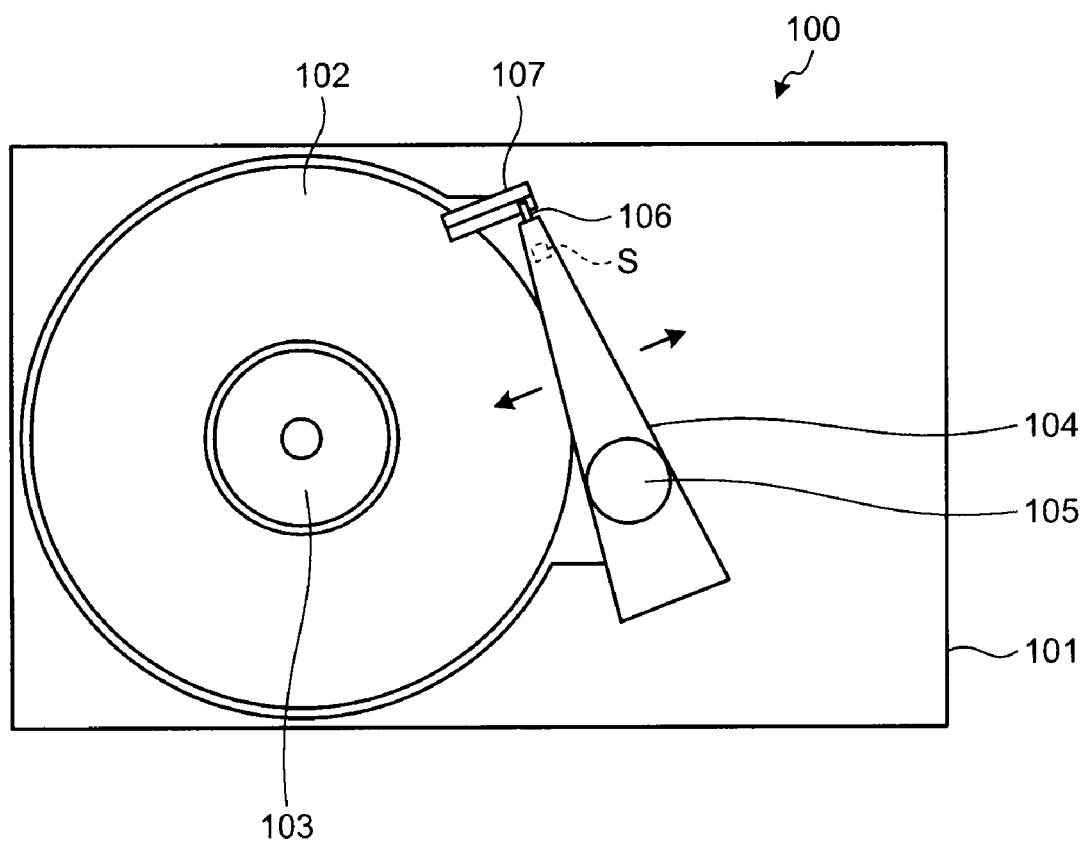
FIG. 1 is a plan view of a magnetic disk apparatus according to an embodiment of the present invention.

FIG. 1 is a plan view of a magnetic disk apparatus 100 according to an embodiment of the present invention. The magnetic disk apparatus 100 employs load/unload (LUL) method and includes a magnetic disk 102, an arm 104, and a ramp 107 on a base 101.

The magnetic disk 102 is mounted on a spindle motor (not shown) that is positioned under the magnetic disk 102 through a clamp 103, and rotates and stops by the action of the spindle motor. The arm 104 is a rotary actuator and rotates around a rotary shaft 105. A magnetic head slider (slider) S having a magnetic head is mounted near the tip of the arm 104. A lift tab 106 is provided at the tip of the arm 104. The ramp 107 is provided above and near an outer periphery of the magnetic disk 102.

When the magnetic disk 102 is in a stand still state (i.e., not rotating), the arm 104 is positioned such that the slider S stays away from a main surface (front surface) of the magnetic disk 102 and the lift tab 106 rides on the ramp 107. When the magnetic disk 102 starts to rotate, the arm 104 rotates around the rotary shaft 105 counterclockwise, the lift tab 106 slidingly moves on the ramp 107, and the slider S is loaded on the main surface of the magnetic disk 102 to be opposed thereto.

In the magnetic disk 102, a recording zone made of a magnetic material is formed in the main surface of a glass substrate 1. The glass substrate 1 for producing the magnetic disk 102 is explained below.

Figure 2:
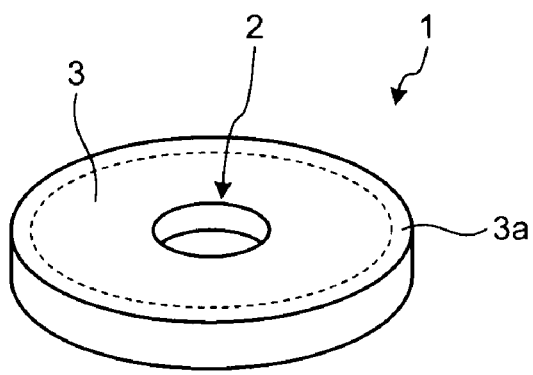
FIG. 2 is a perspective view of a glass substrate for manufacturing a magnetic disk shown in FIG. 1.

FIG. 2 is a perspective view of the glass substrate 1. The glass substrate 1 is disk-shaped and it is made of aluminosilicate glass. The glass substrate 1 has a circular hole 2 in its center portion. Moreover, a ski jump 3b (see FIG. 3) is formed on an edge portion 3a of an outer periphery of the main surface (front surface) 3 of the glass substrate 1.

Figure 3:
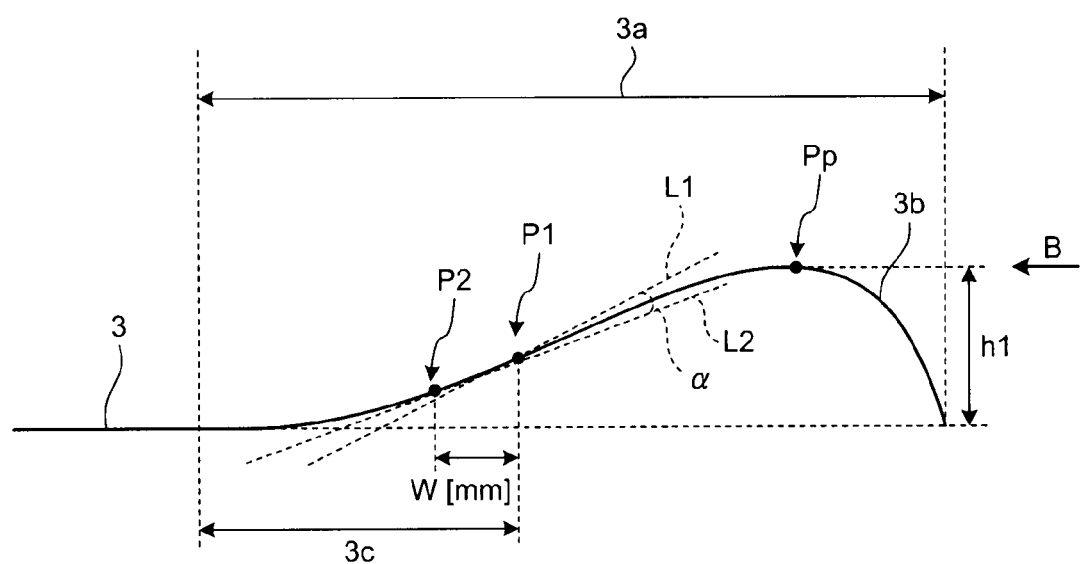
FIG. 3 is a schematic diagram illustrating a cross section of an edge portion on an outer peripheral side of the glass substrate along a radial direction.

FIG. 3 is a schematic diagram of a cross section of the edge portion 3a along the radial direction of the glass substrate 1. The ski jump 3b is an asymmetric protrusion in the edge portion 3a of the main surface 3 of the glass substrate 1. The ski jump 3b is generally concave in a portion 3c from the inner edge of the edge portion 3a to a transition point P1. Moreover, the ski jump 3b is generally convex in a portion from the transition point P1 to a peak point Pp where the ski jump 3b has maximum height h1. The height of the ski jump 3b then sharply decreases in a portion from the peak point Pp toward the outer edge of the edge portion 3a.

A rate of change of angles of tangents to the slope of the ski jump 3b in the portion 3c in a radial direction is equal to or less than 10/W μrad/mm where W is a width of the slider in millimeters [mm]. Specifically, for example, an angle α between a line L1 and a line L2 is equal to or less than 10 microradians where the line L1 is a tangent to the slope of the ski jump 3b at the transition point P1 and the line L2 is a tangent to the slope of the ski jump 3b at a point P2 where the point P2 is located at a distance W, i.e., the width of the slider, toward the inner edge of the edge portion 3a. Therefore, when the magnetic disk 102 is manufactured using the glass substrate 1 and it is used in the magnetic disk apparatus 100 that employs the LUL method, the slider S can be prevented from coming into contact with the main surface 3 of the magnetic disk 102. Thus, more stable floating of the slider S is attainable.

Figure 4:
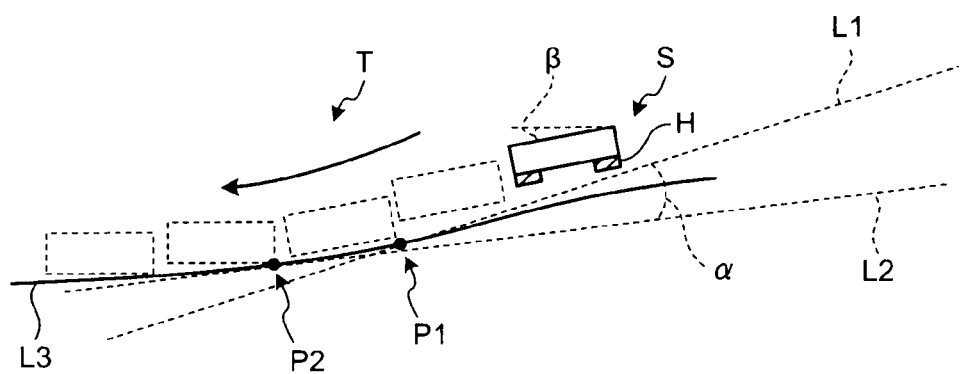
FIG. 4 is a schematic diagram illustrating how a slider is loaded onto the magnetic disk manufactured by using the glass substrate.

FIG. 4 is a schematic diagram illustrating how the slider S is loaded onto the magnetic disk 102. A solid line L3 represents the ski jump in a portion from the peak point Pp toward the center of the magnetic disk 102. For the convenience of an explanation, the same reference numerals as in FIG. 3 have been used in FIG. 4 for the same or similar parts. The width W of the slider S represents the width of the slider S in a radial direction of the magnetic disk 102. It is assumed that the width W of the slider S is 1 millimeter.

At the point where the slider S, having a magnetic head H, is loaded onto the opposing main surface 3, the slider S slants relative to the main surface 3 by an angle β and floats over the main surface 3. The slider S slides along the ski jump tracking a trajectory indicated by the arrow T when being loaded. As stated above, because the solid line L3 in the portion from the transition point P1 toward the outer edge is convex, no problem occurs.

Meanwhile, the solid line L3 in a portion from the transition point P1 toward the inner edge is concave. Therefore, the rate of change of angles of tangents to a slope of the ski jump in this portion is larger. If the slope angle changes sharply, the slider S slides at a large entry angle relative to the slope, so that the slider S may hit the main surface 3 or the surface of the ski jump. However, when the rate of change of angles of tangents to a slope of the ski jump is equal to or less than 10 μrad/mm, the entry angle of the slider S is small, so that the slider S does not hit the main surface 3.

Figure 5:
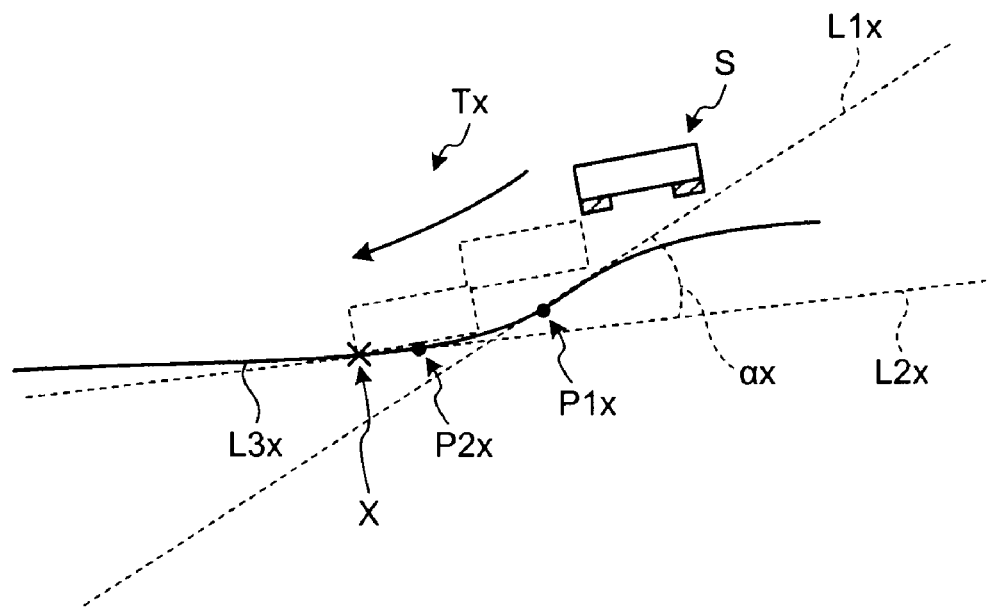
FIG. 5 is a schematic diagram illustrating how the slider is loaded onto a magnetic disk manufactured by using a glass substrate having a larger rate of change of angles of tangents to a slope of a ski jump.

FIG. 5 is a schematic diagram for explaining what happens when the rate of change of angles of tangents to a slope of the ski jump is larger. A solid line L3x represents a ski jump with a larger rate of change of angles of tangents to a slope of the ski jump. Specifically, an angle αx between a line L1x and a line L2x is greater than 10 microradians where the line L1x is a tangent to the slope of the ski jump at a transition point P1x and the line L2x is a tangent to the slope of the ski jump 3b at a point P2s where the point P2 is located 1 millimeter, i.e., the width W of the slider, toward the inner edge. Accordingly, the rate of change of angles of tangents to a slope of the ski jump is lager. Therefore, when the slider S slides along the ski jump tracking a trajectory indicated by an arrow Tx, the slider S intersects with the solid line L3x at a point X. That means the slider S hits the surface of the ski jump.

Furthermore, in the glass substrate 1, the loaded slider does not hit the main surface of the magnetic disk when the deviation of the height of the ski jump in the circumferential direction from the average value is within 25%, enabling to realize more stable floating of the slider, which is explained in detailed below.

Figure 6:
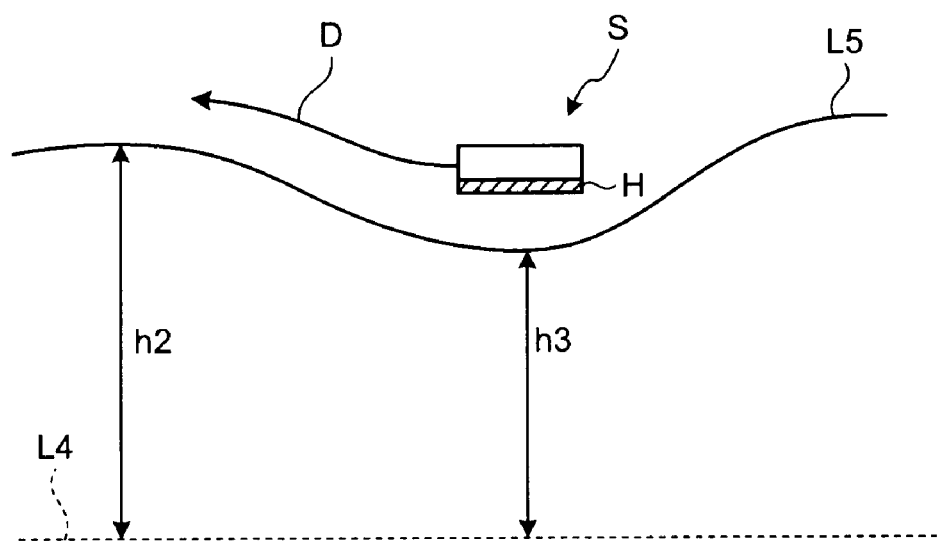
FIG. 6 is a schematic diagram illustrating how the slider is loaded onto the magnetic disk manufactured by using the glass substrate shown in FIG. 2, viewed from an outer peripheral side of the glass substrate along a radial direction.

FIG. 6 is a schematic diagram illustrating how the slider S is loaded onto the magnetic disk 102 when viewed from an outer peripheral side of the glass substrate 1 along a radial direction, i.e., when the glass substrate 1 is viewed from a direction indicated by an arrow B in FIG. 3. A line L4 represents the level of the main surface 3 and a solid line L5 represents the ski jump in the circumferential direction. The height of the ski jump fluctuates over the circumferential direction of the glass substrate 1. Assume, for example, that the ski jump has different heights h2 and h3 at different positions.

Assuming that the slider S is loaded at a position where the height is h3 that is lower than the height h2. At this time, the magnetic disk 102 is rotating, so that the slider S relatively moves toward the direction indicated by an arrow D and reaches the position where the height is h2. If the deviation of the height of the ski jump is large, the height difference between the height h3 and the height h2 is also large. However, as far as the deviation of the height of the ski jump in the circumferential direction from an average value of the heights is kept equal to or lower than 25%, the slider S does not hit the ski jump at the height h2.

As explained above, when the magnetic disk 102 is manufactured using the glass substrate 1 and is used for the magnetic disk apparatus 100, the loaded slider S can be prevented from hitting the main surface 3, so that more stable floating of the slider S is attainable.

A method for manufacturing the glass substrate 1 is explained below. The method includes (1) a glass substrate manufacturing process, (2) a shape machining process, (3) an end-surface mirror-polishing process, (4) a main-surface rough-polishing process, and (5) a main-surface precision-polishing process in this order. Each of the processes is explained in detail below. The numeric values are exemplified for a glass substrate for a 1-inch magnetic disk.

In the glass substrate manufacturing process, a glass plate preform made of amorphous aluminosilicate glass is manufactured using a float method. The glass plate preform is heated and is softened to produce a 0.6-millimeter-thick glass plate by a redraw method for drawing a glass plate preform to a desirable thickness. The redrawing process is performed by the redrawing method disclosed in, for example, Japanese Patent Application Laid-open No. 2007-126302. The redrawing method disclosed in Japanese Patent Application Laid-open No. 2007-126302 is preferable because a glass plate having small surface roughness is easily produced with this redrawing method. However, other known methods such as a float method, a fusion method, or a down-draw method can also be employed using a molten glass as a material.

In the shape machining process, a 0.6-millimeter-thick disk-shaped glass substrate having a diameter of 28.7 millimeters is formed from the sheet glass redrawn in the redrawing process. Thereafter, a circular hole 1a of diameter 6.1 millimeter is formed in the center of the glass substrate using a cylindrical polishing stone, the outer peripheral end surface of the glass substrate is polished so that the glass substrate has a diameter of 27.43 millimeters, and then the outer peripheral end surface and an inner peripheral end surface are chamfered.

In the end-surface mirror-polishing process, the glass substrate 1 is rotated and outer and inner peripheral end surfaces of the glass substrate are polished by a conventional brush polishing method such that the maximum surface roughness Rmax is made to be about 1 micrometer and the average surface roughness Ra is made to be about 0.3 micrometer. The polished glass substrate is cleaned with water. The diameter of the polished glass substrate is 27.4 millimeters.

Figure 7:
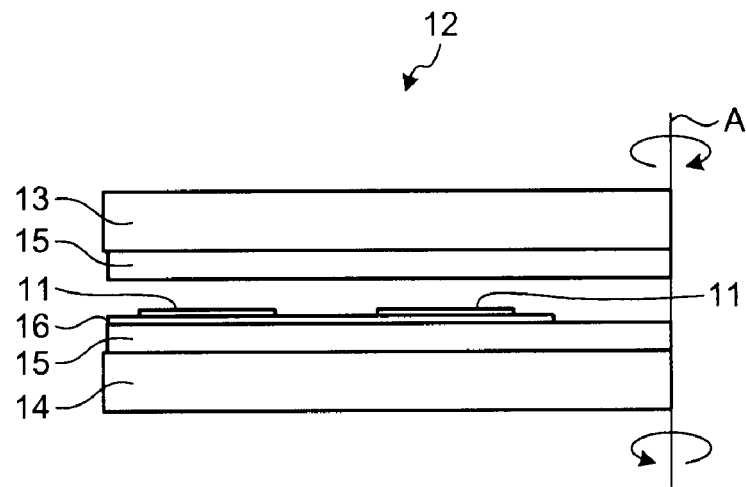
FIG. 7 is a side view illustrating part of a polishing machine that simultaneously polishes front and rear surfaces of the glass substrate.
Figure 8:
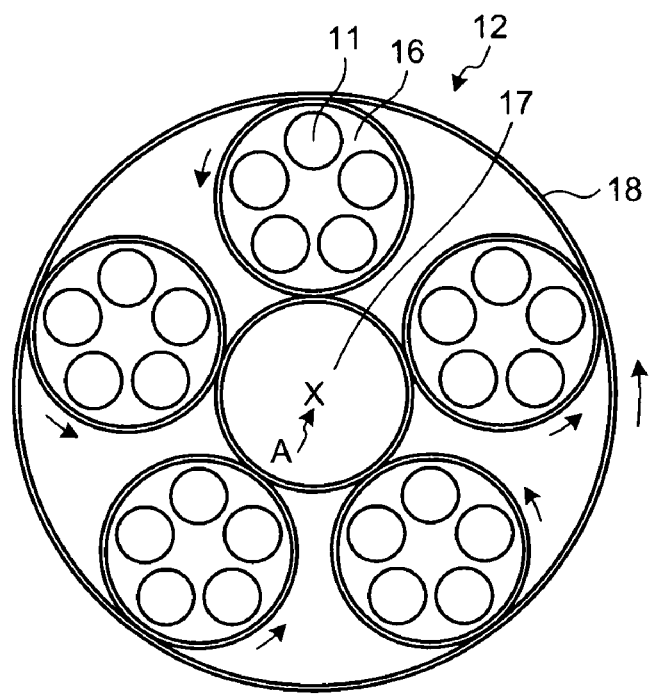
FIG. 8 is a plan view of the polishing machine without an upper table.

In the main-surface rough-polishing process, the main surface can be roughly polished by using a commercially available polishing machine shown in FIGS. 7 and 8 that includes a planetary gear mechanism that simultaneously rough-polishes the main surface and a rear surface. FIG. 7 is a side view illustrating part of such a polishing machine 12. The polishing machine 12 includes an upper table 13 and a lower table 14 both made of cast iron, carriers 16 arranged between the upper table 13 and the lower table 14 to retain a glass substrates 11, and polishing stones 15 made of cerium oxide, each of which is arranged on the upper table 13 and the lower table 14 to be in contact with the glass substrates 11. Namely, the polishing machine 12 retains the glass substrates 11 with the carriers 16 between the upper table 13 and the lower table 14, presses the glass substrates 11 by the upper table 13 and the lower table 14 at a predetermined processing force, and rotates the upper table 13 and the lower table 14 around an axis A in opposite directions while supplying polishing solution such as pure water at a predetermined supply amount between the polishing stones 15 and the glass substrate 11. Thus, each of the glass substrates 11 slides on the surfaces of the polishing stones 15, so that the both surfaces of the glass substrate 11 are simultaneously polished.

The cerium oxide polishing stone 15 is made of resin in which cerium oxide powders are dispersed. For example, phenol resin, epoxy resin, melamine resin, polyester resin, or urethane resin that is used for a general polishing stone, or a mixture of two or more of these resins can be used as the resin for the cerium oxide polishing stone.

FIG. 8 is a plan view of the polishing machine 12 without the upper table 13. Each of the carriers 16 retains five glass substrates 11 at maximum. A gear formed on an outer periphery of each of the carriers 16 engages with a gear formed on an outer periphery of a sun gear 17 and with an internal gear 18. With this configuration, each of the carriers 16 rotates on its axis and moves along the periphery of the sun gear 17, so that the both surfaces of each of the glass substrates 11 retained by the carriers 16 are uniformly polished.

In the main-surface rough-polishing process, a ski jump is formed on the glass substrate. A ski jump having desirable characteristics can be formed by appropriately adjusting the polishing conditions. The polishing conditions can be polishing pressure onto the glass substrate, the number of rotations of the upper table and the lower table, and the type of resin for the cerium oxide polishing stone.

In the main-surface precision-polishing process, in a polishing machine including a planetary gear mechanism similar to the polishing machine 12, for example, while supplying slurry including colloidal silica, the main surface of the glass substrate is mirror-polished with a hard-polyurethane polishing pad until the glass substrate gets a desirable thickness of 0.381 millimeter.

The main surface and end surface of the glass substrate 1 that has been cleaned is visually checked. After the visual check, a precise checking utilizing the light reflection, scattering, and transmission is performed. As a result, it is confirmed that there are no defects such as protrusion created by such as particle adhesion or scratches on the main surfaces and the end surfaces of the glass substrates. This is how the glass substrates 1 according to the present embodiment are manufactured. Each of the finished glass substrates 1 has the inner diameter of 7 millimeters, the outer diameter of 27.4 millimeters, and the thickness of 0.381 millimeter, which are within the predetermined dimension range for a glass substrate used for a 1.0-inch magnetic disk.

For the material of the glass substrate 1, a glass ceramic such as an amorphous glass or a crystallized glass can be employed. Especially, the amorphous glass is preferable from the viewpoint of molding characteristics or machining characteristics. Other than the amorphous aluminosilicate glass, the preferable glasses are, for example, a soda-lime glass, a soda aluminosilicate glass, an aluminoborosilicate glass, a borosilicate glass, an air-cooled or liquid-cooled thermally toughened glass, and a chemically toughened glass.

With the above manufacturing method, ten glass substrates each for every sample are manufactured. Every sample had different ski jump characteristics by changing the polishing conditions such as polishing pressure onto the glass substrates, the number of rotations of the upper table and the lower table, and the type of the resin for the cerium oxide polishing stone in the main-surface rough-polishing process.

The glass substrates per sample were checked for the number of load and unload operations until head crash occurs by installing each glass substrate in an LUL magnetic disk apparatus having a 1-millimeter-wide slider and repeating the load and unload operations. If seven or more out of the ten magnetic disk apparatuses result in equal to or more than 500,000 LUL operations until head crash occurs, the characteristics of the sample were taken to be satisfactory. On the other hand, if less than seven out of the ten magnetic disk apparatuses result in equal to or more than 500,000 LUL operations until head crash occurs, the characteristics of the sample were taken to be unsatisfactory.

FIG. 9 is a table illustrating characteristics of the ski jump, the number of LUL operations until head crash occurs, and assessment of the manufactured glass substrates for the samples. The measurement of the characteristics of the ski jump is performed using a commercially available surface measuring apparatus. In this table, the rate of change of angles of tangents to a slope of the ski jump exhibits the maximum value in the range between the flat portion in the inner circumferential side and the transition point. The height of the ski jump is measured at four points at 90-degree intervals in the circumferential direction of the glass substrate to evaluate the deviation, and the maximum values, the minimum values, the average values, and the deviations are listed.

As shown in FIG. 9, the glass substrates of the samples No. 1, No. 4, No. 8, and No. 9 had the maximum rate of change of angles of tangents less than or equal to 10 μrad/mm and had the deviation in heights less than or equal to 25%. However, equal to or more than seven magnetic disk apparatuses resulted in equal to or more than 500,000 LUL operations and other magnetic disk apparatuses also resulted in stable high values of between 450,000 and 500,000 operations. Thus, the samples No. 1, No. 4, No. 8, and No. 9 were assessed to be satisfactory (marked as A in FIG. 9).

The samples No. 3 and No. 10 had the maximum rate of change of angles of tangents less than or equal to 10 μrad/mm, however they had the deviation in heights greater than 25%. As a result, although equal to or more than seven magnetic disk apparatuses resulted in equal to or more than 500,000 LUL operations, other magnetic disk apparatuses resulted in relatively unstable values of between 400,000 and 450,000, or less LUL operations. Thus, the samples No. 3 and No. 10 were assessed to be OK (marked as B in FIG. 9).

The samples No. 2, and No. 5 to No. 7 had the maximum rate of change of angles of tangents to a slope greater than 10 μrad/mm, and had the deviation in heights greater than 25%. As a result, it was less than seven magnetic disk apparatuses that resulted in equal to or more than 500,000 LUL operations. Thus, the samples No. 2, and No. 5 to No. 7 were assessed to be unsatisfactory (marked as C in FIG. 9).

Based on these results, it was confirmed that occurrence of head crash can be suppressed when the maximum rate of change of angles of tangents to a slope of the ski jump is less than or equal to 10 μrad/mm, and that occurrence of head crash can be further stably suppressed when the deviation of the height is less than or equal to 25%.

The above test results were obtained for the 1-millimeter slider width. When a glass substrate satisfies a condition that the rate of change of angles of tangents to a slope of the ski jump in the radial direction in the range between the flat portion in the inner circumferential side and a transition point on the slope is equal to or less than 10/W μrad/mm, where W is the width of the slider in millimeters [mm], such glass substrate can suppress occurrence of head crash.

According to an aspect of the present invention, a magnetic head slider can be prevented from hitting a main surface of a magnetic disk when the magnetic head slider is loaded or unloaded. Therefore, a glass substrate for a magnetic disk and a magnetic disk apparatus that have achieved stable floating of the magnetic head slider over the magnetic disk can be advantageously provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic disk apparatus that operates based on a load/unload method comprising a glass substrate wherein
    a main surface of the glass substrate is disk-shaped and a ski jump appears on an outer peripheral end portion of the main surface opposing a magnetic head slider to be loaded,
    a rate of change of angles of tangents to a slope of the ski jump in a radial direction in a range between an inner circumferential side and a transition point on the slope is equal to or less than 10/W grad/mm where W is a width of the magnetic head slider,
    a deviation of a height of the ski jump in a circumferential direction from an average value is equal to or less than 25% and
    an average value of the height of the ski jump is within a range from 80.3 nanometers to 378.1 nanometers.

2. The magnetic disk apparatus according to claim 1, wherein the magnetic head slider is loaded slantingly as the outside of the head slider is lifted onto the main surface of the glass substrate.

* * * * *